Oct. 28, 1969     S. RENAUDO     3,475,517
PROCESS FOR MAKING BLOCK POLYMERS OF OLEFINS
Filed Oct. 14, 1966     2 Sheets-Sheet 2

INVENTOR
SAMUEL RENAUDO
BY
ATTORNEYS

United States Patent Office 3,475,517
Patented Oct. 28, 1969

3,475,517
PROCESS FOR MAKING BLOCK POLYMERS OF OLEFINS
Samuel Renaudo, Bartlesville, Okla., assignor to Phillips Petroleum Company, a corporation of Delaware
Continuation-in-part of application Ser. No. 384,871, July 24, 1964. This application Oct. 14, 1966, Ser. No. 586,870
Int. Cl. C08f 15/04, 1/32, 1/96
U.S. Cl. 260—878
12 Claims

ABSTRACT OF THE DISCLOSURE

A method of block polymerizing two different mono-1-olefins comprises polymerizing a first olefin as a solid phase polymer slurry in liquid olefin as diluent in the presence of a condensation catalyst comprising active metal such as titanium trichloride and reducing agent such as diethyl aluminum chloride. The slurry is then settled to increase the solids content and mixed with inert low boiling hydrocarbon liquid to form a mixture of active polymer, monomer and hydrocarbon solvent. The mixture is fractionally distilled to remove monomer and then passed to a chamber wherein additional reducing agent is added to polymerize residual monomer. The slurry is then passed to a third reaction zone wherein a second, different mono-1-olefin is added and polymerized in the presence of the preformed polymer.

---

Figure 1:
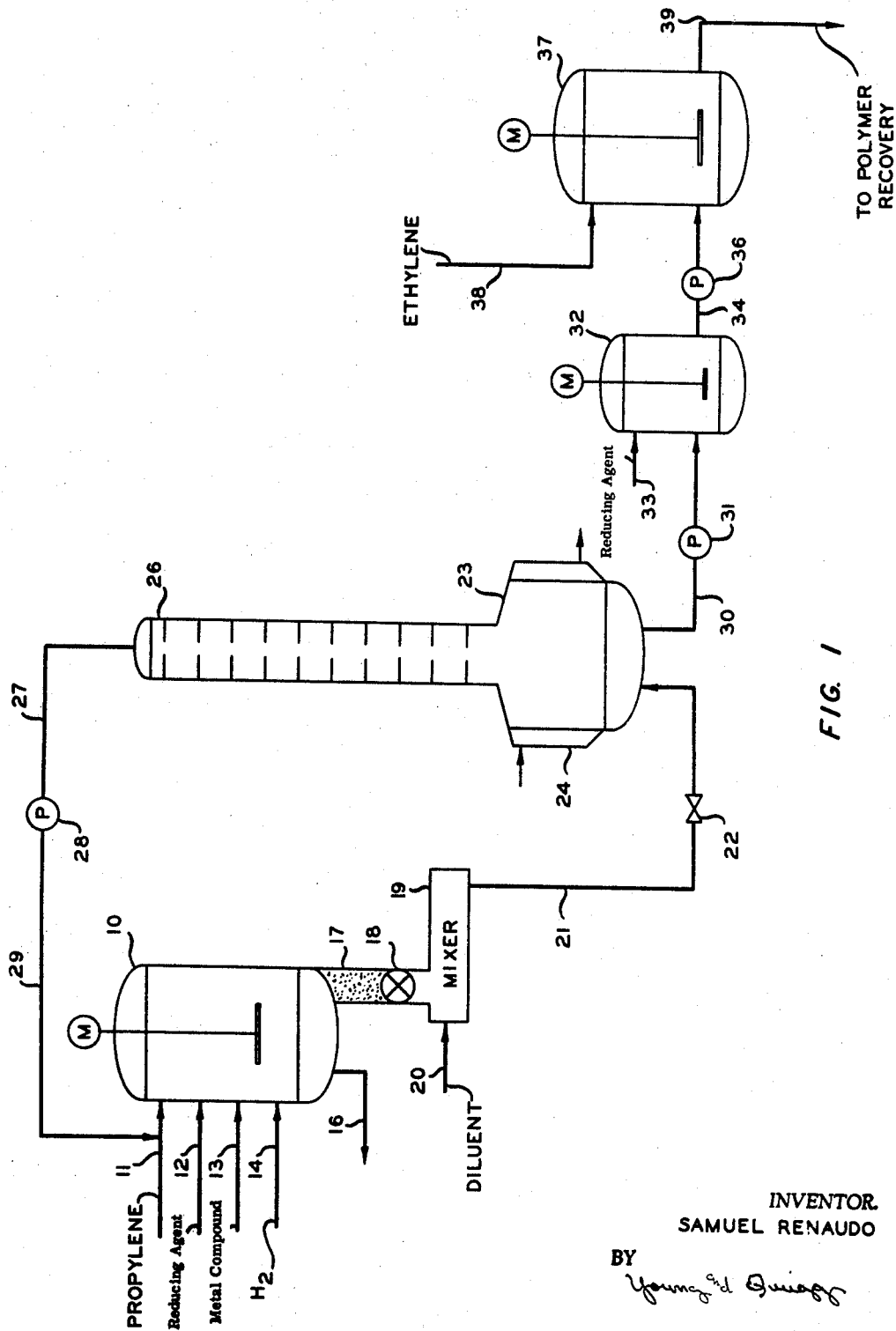

This is a continuation in part of my copending application, Ser. No. 384,871, filed July 24, 1964, now abandoned.

This invention relates to apparatus for the block copolymerization of olefins in a continuous operation. In another aspect it relates to a method of copolymerizing two different mono-1-olefins in the substantial absence of each other.

It is known that mono-1-olefins can be polymerized sequentially in such a manner that the polymer molecules contain distinct polymer segments or blocks which are non-identical and which contribute significantly to the properties of the total polymer. The preparation of block copolymers is described in British patent specification No. 889,659 of Phillips Petroleum Company. One type of polymer which can be made in accordance with the procedure described is a polymer in which each block is made up essentially of only one type of monomer. In this case polymerization of each monomer is carried out in the substantial absence of a different monomer. It has been found that very valuable properties can be obtained by co-polymerizing mono-1-olefins in this manner and that similar results cannot be realized by making physical blends of different homopolymers based on the same monomers and combined in the same proportions. For example, block copolymers of ethylene and propylene can be prepared so that the polymer molecules contain a polyethylene block and a polypropylene block. This product has much better impact strength and low temperature properties than does a physical blend of polyethylene and polypropylene of the same proportions of ethylene and propylene.

Although block copolymers of the type described above can be readily prepared on a laboratory scale, in continuous commercial operations may problems are involved which are not present in conventional processes directed to the formation of homopolymers or random copolymers of the same monomers. One of the difficulties lies in obtaining complete removal of unreacted monomer or consumption of all of the monomer which is used first so that it will not be present in the system when the second monomer is polymerized. Another very critical problem is that of maintaining the first polymer and the catalyst associated therewith in an active state so that when the second monomer is polymerized, the second block is added to the molecules of the first polymer. If the first polymer is inactivated during the procedure in which the monomers are being changed, the result obtained is merely a physical blend of independent homopolymer molecules so that the advantages of block copolymerization, as discussed above, are not realized. On a laboratory scale these difficulties can easily be overcome by using the same polymerization catalyst and diluent for the polymerization of both monomers, the first monomer being either completely consumed or any unreacted monomer being removed from the polymerization mixture by vaporization. On a commercial scale, however, carrying out the first polymerization to completion may require an unduly long residence time. Also, the complete removal of monomer by vaporization, even where an inert gas is used for stripping purposes, is an expensive and time-consuming operation.

According to my invention, a method is provided for copolymerizing two different mono-1-olefins so that each olefin is polymerized in the substantial absence of the other but a single polymer product is obtained. In this method a first mono-1-olefin is contacted in a liquid phase but in the absence of inert diluent with a coordination polymerization catalyst such as is formed by mixing two components, one of which is a metal compound and the other is a reducing agent. The polymerization conditions in this first reaction are maintained to form particulate, solid phase polymer as a slurry in the liquid olefin. A portion of this polymer can be recovered and used as the homopolymer while all or a remainder of this polymer can be modified by subsequent polymerization steps in which the solid polymer is separated from the bulk of the first olefin and then washed with an inert liquid hydrocarbon diluent. At least some of this diluent which contains remaining first olefin is separated from the solid polymer. A second slurry of the polymer is formed in the inert hydrocarbon diluent. To this second slurry is added more of the catalyst reducing agent component and the slurry is then held under polymerization conditions in order to polymerize the small residual amounts of the first olefin which may be present. This slurry is then combined with a second different mono-1-olefin which is polymerized in the presence of the first formed polymer and the catalyst associated therewith.

In a preferred aspect of this invention, the polymer slurry which is first formed is allowed to settle to increase the solids content thereof and this slurry is then mixed with a saturated liquid hydrocarbon to form a mixture of hydrocarbon, polymer and olefin. This mixture is then subjected to fractional distillation to obtain an overhead stream of olefin which can be reused in the first polymerization and a bottoms stream which is a slurry of the polymer in the hydrocarbon diluent. This slurry is then contacted with additional reducing agent and, finally, with the second monomer as described above.

In another preferred aspect, the first formed polymer is allowed to settle in a washing zone while contacted countercurrently with saturated hydrocarbon. This aspect of the invention is particularly valuable when the first polymer is a polypropylene and the saturated hydrocarbon used for washing is liquid propane. The polypropylene recovered from the bottom of the washing zone is reslurried in liquid propane and treated as described above with additional reducing agent and second monomer, preferably ethylene. The mixture of propane and propylene withdrawn from the upper portion of the washing zone can be fractionated or hydrogenated to convert the propylene to propane, in which case the total product from hydrogenation can be reused to wash olefin from the polypropylene.

In still another preferred aspect, the slurry of first formed polymer is passed into an elongated washing zone in which the polymer is compressed and conveyed through said zone while being washed with liquid saturated hydrocarbon. The solids are separated from the liquid hydrocarbon and olefin and treated as described above with additional reducing agent and then the second olefin. The mixture of liquid hydrocarbon and olefin is fractionated to separate the olefin which is reusable in the first reaction, from the liquid hydrocarbon which is then returned to the washing zone.

The apparatus of my invention includes, in combination, first reactor means for polymerizing a first olefin in the presence of a coordination polymerization catalyst, means for settling the solid polymer formed in said first reactor means from the bulk of said first olefin, means for washing said solid polymer with an inert liquid hydrocarbon diluent, means for separating said diluent and unreacted first olefin from the solid polymer, means for reslurrying the solid polymer in a liquid diluent, second reactor means for contacting the reslurried polymer with additional reducing agent under conditions to polymerize residual olefin, and third reactor means connected to receive slurry from said second reactor means, and means for injecting a second olefin to said third reactor means.

In one of the preferred apparatus aspects of this invention, the means for contacting polymer from the first reactor and separating the polymer from remaining olefin includes a mixer connected to receive polymer solids from the reactor and contact same with diluent, and a fractionation zone connected to receive the resulting mixture of polymer, olefin and diluent and vaporize the unreacted olefin from the mixture. In another preferred aspect of the apparatus, a washing column is provided to receive polymer solids from the first reactor and contact these solids countercurrently with a hydrocarbon diluent. In another aspect, the polymer solids from the reactor are received by a perforated-wall, auger conveyor having means for injecting diluent into the polymer solids being conveyed by the auger, and means for withdrawing the mixture of diluent and olefin from the conveyor.

It is an object of my invention to provide a method and apparatus suitable for the continuous block copolymerization of mono-1-olefins, each in the substantial absence of the other.

Another object of my invention is to provide a method and apparatus for polymerizing an olefin, a portion of which can be recovered as a first product and the remainder can be treated in order to modify properties so that a product is obtained having improved impact strength and low temperature brittleness.

Another object of my invention is to provide a method and apparatus for polymerizing an olefin, a portion of which can be recovered as a first product and the remainder can be treated in order to modify properties so that a product is obtained having high flexural modulus and low temperature brittleness.

Another object is to provide apparatus and a method for continuously polymerizing propylene without the use of an inert diluent and then copolymerizing ethylene in the presence of a diluent but in the absence of unreacted propylene.

Another object of my invention is to provide a method and apparatus for efficiently separating propylene from polypropylene while maintaining the activity of the associated catalyst residues so that the polymerization can be continued with ethylene but in the absence of propylene.

Figures 2, 3:
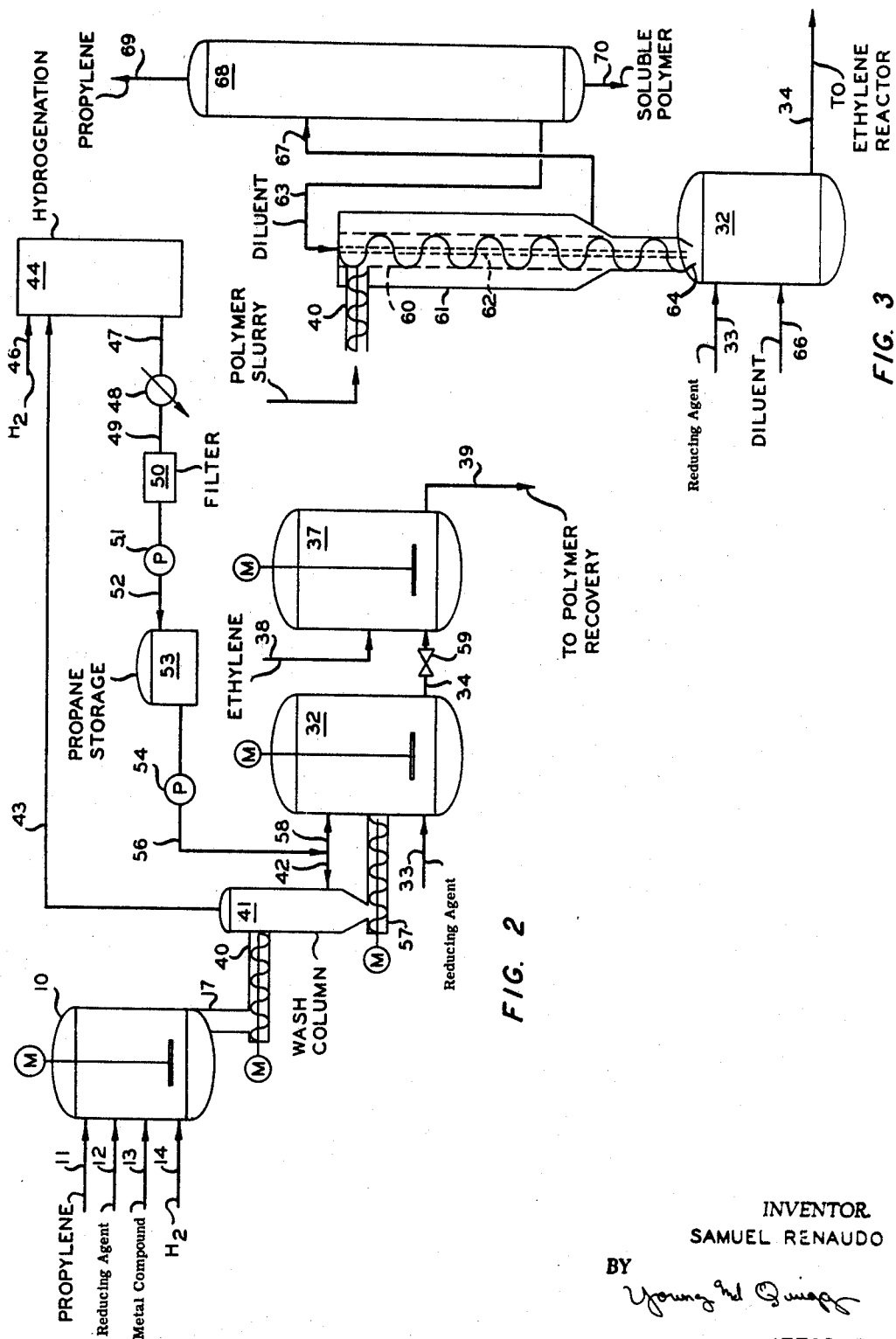

Other objects, advantages and features of my invention will be apparent to those skilled in the art from the following discussion and drawing in which FIGURE 1 is a schematic flow diagram in one aspect of the invention in which unreacted olefin is removed from the first polymer by fractional distillation after being mixed with an inert diluent;

FIGURE 2 is a schematic diagram of the invention in which a wash column is used to separate unreacted propylene by contacting the polypropylene with propane in countercurrent flow; and FIGURE 3 is a partial schematic diagram showing the separation of unreacted olefin from polymer by washing with an inert diluent in a perforated-wall, auger conveyor.

The present invention is of greatest value as applied to the block copolymerization of propylene and ethylene where propylene is polymerized first in the liquid phase and then ethylene is polymerized in the presence of the polypropylene and in an inert diluent. The invention can be used, however, in its broader aspects for the block copolymerization of any two mono-1-olefins having from 2 to 8 carbon atoms such as 1-butene, 1-pentene, 4-methyl-1-pentene, 1-octene, and the like.

The catalyst which is employed can be any of the catalyst systems commonly referred to as coordination polymerization catalysts. Such catalysts are formed from at least two components, one of which is a compound of a metal from Groups IV–B, V–B, VI–B or VIII of the Periodic Chart, and the second component is a reducing agent, normally an organometal, metal hydride, or metal of Groups I–A, II–A or III–A. The Periodic Chart referred to is the Periodic Chart of the Elements by H. G. Deming, Lange's Handbook of Chemistry, 6th edition, Handbook Publishers, Inc., Sandusky, Ohio (1946). These catalyst systems are well known and many examples are available from the literature. Examples of component combinations which are representative include n-butyllithium and titanium tetraiodide; dicyclopentylzinc and titanium butoxide; ethylmagnesium bromide and titanium hydride; triethylaluminum or triphenylaluminum and molybdenum pentachloride; sodium hydride, barium hydride or gallium hydride and iridium chloride; sodium, magnesium or aluminum and vanadium tetrachloride, and the like.

The catalyst systems used in this invention must, of course, be capable of polymerizing mono-1-olefins in mass polymerization and under conditions such that solid polymer is produced in particle form. Preferably the catalyst components include a metal salt and an organometal compound as the reducing agent. A particularly suitable catalyst is one which comprises (a) a compound having the formula $R_nMX_m$, wherein R is an alkyl, cycloalkyl or aryl radical or combinations of these radicals, such as alkaryl, aralkyl and alkylcycloalkyl, X is hydrogen or a halogen, including chlorine, bromine, iodine and fluorine, M is aluminum, gallium, indium or thallium, $n$ is from 1 to 3, inclusive, $m$ is from 0 to 2, inclusive, and the sum of $m$ and $n$ is equal to the valence of the metal M, and (b) a halide of a metal of Group IV–B, V–B, VI–B or VIII. The hydrocarbon radicals which can be substituted for R in the aforementioned formula include radicals having up to about 20 carbon atoms each. Radicals having 10 carbon atoms or less are preferred since the resulting catalyst composition has a greater activity for initiating the polymerization.

Examples of compounds corresponding to the formula $R_nMX_m$ include triethylaluminum, triisobutylaluminum, triphenylaluminum, triethylgallium, tricyclohexylgallium, tri-n-butylindium, triethylthallium, diethylaluminum hydride, ethylaluminum dichloride, diethylaluminum chloride, phenylgallium dibromide, eicosylaluminum diiodide, di-(3-phenyl-1-methylpropyl)indium chloride, and the like.

Preferably the metal salt is a metal halide of a Group IV–B metal, namely titanium, zirconium, hafnium or germanium. These solids include both the tri- and tetrachlorides, bromides and iodides and can be used individually or as mixtures of two or more metal halides. The preferred salt is titanium trichloride and the preferred catalyst system is diethylaluminum chloride plus the reaction product of aluminum and titanium tetrachloride, said reaction product having the approximate formula TiCl₃·1/3AlCl₃.

In these catalyst systems, the mole ratio of the reducing agent to the metal salt is usually in the range of 1:1 to 10:1, and preferably in the range of 2:1 to 5:1. Concentration of the catalyst in the polymerization zone is normally in the range of 0.01 to 5 weight percent based on the monomer charged to that zone, although greater or lesser amounts can be used.

In the polymerization of the second monomer and for washing unreacted first monomer from the first formed polymer, an inert liquid hydrocarbon diluent is used. Preferably this is a saturated hydrocarbon including the paraffins and cycloparaffins having 3 to 12 carbon atoms per molecule such as propane, n-butane, n-hexane, n-heptane, n-dodecane, isooctane, cyclopentane, cyclohexane, and the like.

Polymerization conditions are maintained in both polymerization stages so that the polymer is formed as a solid particle and the reaction mixture is a slurry of solid polymer in liquid diluent or liquefied monomer. Suitable polymerization temperatures can vary from about 0 to 200° F. and are preferably maintained in the range of about 90 to 150° F. The pressure is that required to maintain the reaction medium in the liquid phase although higher pressures can be used.

In order to describe the invention more fully, reference is now made to the drawings where the process is shown for the block copolymerization of propylene and ethylene. Polymers of these monomers have been found to be most valuable in that they have a combination of physical properties which cannot be achieved through the physical blending of homopolymers of propylene and ethylene. The preferred block copolymers are those which contain a major proportion of propylene and a minor proportion of ethylene, for example about 1 to 40 weight percent ethylene and 60 to 99 weight percent propylene. Very good results can be achieved by polymerizing the propylene first as shown in FIGURE 1, and modifying this polymer by subsequently reacting it with ethylene without destroying the catalyst residues which remain associated with the solid polypropylene.

As shown in FIGURE 1, propylene is polymerized in a reactor 10 which is fed continuously with fresh propylene through conduit 11 and catalyst through conduits 12 and 13. Reactor 10 can be any conventional type of polymerization reactor such as a stirred pot reactor or a pipe loop reactor. Diethylaluminum chloride, which is the reducing agent component of the catalyst system, is introduced through conduit 12 and titanium trichloride is added through conduit 13. Hydrogen can also be introduced through conduit 14 to assist in controlling the polymerization process. When hydrogen is used for molecular weight control in reactor 10, preferably about 0.05 to 0.5 mole percent, based on the propylene feed, is used. If it is desired, polypropylene can be recovered from reactor 10 through conduit 16 and used as a separate product of the process. The present invention is concerned, however, with the modification of polypropylene which is formed in reactor 10. This polymer is allowed to settle from reactor 10 into settling leg 17 and in this way the solids content of the slurry is increased. The liquid propylene and soluble components of the catalyst and the hydrogen tend to remain within the reactor. If desired, a separate settling chamber can be provided with recycle of liquid propylene and these soluble components to reactor 10. The slurry in reactor 10 normally contains about 30 to 35 percent of particulate solid polypropylene. Associated with this solid polymer is essentially all of the titanium trichloride component of the catalyst. The settled slurry which is removed from settling leg 17 or from a separate concentrator, if used, contains about 50 to 70 percent solids.

The settled polymer slurry passes from settling leg 17 through a time cycle impulse valve 18 into mixing chamber 19 where the slurry is mixed with inert hydrocarbon diluent, entering zone 19 through conduit 20. Ordinarily sufficient diluent is added in order to provide a slurry having about 20 to 40 percent solids. This slurry is passed through conduit 21 and valve 22 into fractionator 23. Fractionator 23 is provided with a jacket 24 through which a heating medium is circulated to provide the required temperature for vaporization of propylene and some of the diluent. The vaporized propylene and diluent is passed up through the rectification section 26 of the fractionator wherein propylene is fractionated from the diluent so that essentially pure propylene with some hydrogen is removed as an overhead stream through conduit 27 and passed by pump 28 through conduit 29 back to reactor 10. Fractionator 23 is equipped with conventional condensing and refluxing means not shown in this drawing.

The slurry of polypropylene in the inert diluent is removed from fractionator 23 through conduit 30 and passed by pump 31 into reactor 32. Additional diethylaluminum chloride is added to reactor 32 through conduit 33. Although most of the propylene has been removed in fractionator 23, any residual propylene is polymerized in reactor 32. A residence time of about 30 to 120 minutes is sufficient to allow the residual propylene to polymerize. The slurry of polymer and diluent can then be passed from reactor 32 through conduit 34 by pump 36 into reactor 37. Ethylene is added to reactor 37 through conduit 38 and the polymerization is continued in the presence of the polypropylene and associated catalyst. The residence time in reactor 37 depends upon the amount of ethylene which is desired to be incorporated in the final product. Ordinarily this residence time is about 15 to 150 minutes. The copolymer product is then withdrawn from reactor 37 through conduit 39 and passed to conventional polymer recovery and finishing operations.

To assist in propylene removal in reactor 32, propylene can be withdrawn from the vapor phase of this reactor, mixed with hydrogen and hydrogenated in a separate reactor not shown, using catalysts and conditions which are conventional in the industry. For example, the propylene can be hydrogenated with a reduced nickel-kieselguhr catalyst at a temperature of 300° F. with a stoichiometric amount of hydrogen so that no hydrogen is introduced into reactor 32. The presence of hydrogen in reactor 32 is undesirable because it interrupts chain growth and inhibits the production of block copolymer. The propane which is thus formed on hydrogenation can be recycled to reactor 32 below the liquid level and in this way strip additional propylene from the liquid mixture.

The polymerization temperature in reactor 10 is preferably in the range of 90–150° F. and the pressure is that required to maintain the propylene in a liquid phase. Higher pressures can be used by pressurizing with an inert gas but this is unnecessary. The temperature for the residual polymerization in reactor 32 is in the same range as indicated for reactor 10. A lower pressure is required, however, since an inert diluent is present as the reaction medium and the pressure here is merely that required to maintain the diluent in the liquid phase. It is desirable that any propylene present be vaporized when using the hydrogenation step described above. Ordinarily the pressure in reactor 32 is in the range of 0 to 25 p.s.i.g. and a pressure in the range of 5 to 15 p.s.i.g. is preferred.

The conditions for polymerization of the ethylene in reactor 37 include a temperature in the range of 0 to 250° F., preferably in the range of 75–150° F., for higher boiling solvents, such as n-heptane, and preferably in the range of 200–250° F. for a low boiling solvent such as butane and a pressure required to maintain the reaction mixture in the liquid phase. Ethylene partial pressures are generally in the range of 15 to 400 p.s.i.g. It was found that a low boiling solvent such as butane, maintained the polymer in suspension at a temperature in the range of 200–250° F. while preventing the swelling or dissolving of the polypropylene.

A very effective method of removing propylene from the polypropylene without inactivating the associated catalyst residues is shown in FIGURE 2. This method accomplishes the removal of unreacted propylene by washing with liquid propane. In FIGURE 2, reactor 10 is fed propylene through conduit 11, catalyst through conduits 12 and 13, and hydrogen through conduit 14. Polymer solids settle from reactor 10 into settling leg 17 and as previously described in connection with FIGURE 1, a separate settling vessel can be used with recycle of liquid propylene and dissolved catalyst and hydrogen to the reactor. The concentrated slurry of polypropylene in liquid propylene is removed from the bottom of settling leg 17 and passed by auger conveyor 40 to the upper portion of wash column 41. The slurry enters wash column 41 and the solid polypropylene particles gravitate downwardly while being washed in countercurrent flow with liquid propane which is introduced near the bottom of colum 41 through conduit 42. It is highly advantageous to use liquid propane in this operation because of the substantial difference in density between the polypropylene and the liquid propane, thus facilitating the settling of the polymer and permitting higher flow rates of propane through the wash column and in turn improved propylene removal.

The mixture of propane and propylene removed from the top of the column 41 by way of conduit 43 can be fractionated to separate the components, in which case the propylene can be recycled through reactor 10 and the propane reused in the washing operation. In order to insure complete removal of the propylene from the recycled propane, a portion of which is used as the polymerization diluent for the ethylene polymerization, a part or all (as shown in FIGURE 2) of the propane from column 41 can be passed to a hydrogenation reactor where the propylene is hydrogenated to form propane as described in connection with reactor 32 of FIGURE 1. This treatment can be applied to the total stream of propylene and propane in conduit 43 which is passed to catalyst chamber 44 into which hydrogen is also introduced by way of conduit 46. The propane removed from hydrogenation unit 44 through conduit 47 is condensed in cooler 48 and passed by conduit 49 through filter 50. Filter 50 in conduit 49 insures that none of the nickel catalyst enters the polymerization reactor. The propane is then passed by pump 51 through conduit 52 into storage vessel 53. From this vessel the propane is passed by pump 54 through conduits 56 and 42 back to wash column 41. It is within the scope of my invention to employ both fractionation and then hydrogenation of the fractionated propane containing residual amounts of propylene. By this method, the requirements for fractionation efficiency are reduced since essentially pure propylene can be recovered as an overhead stream and small amounts of propylene can be taken out with the propane as a bottom product, this propylene then being hydrogenated before the propane is reused as a wash liquid.

The washed polypropylene solids from the bottom of column 41 pass into auger conveyor 57 and enter reactor 32 as shown in FIGURE 1. Additional diethylaluminum chloride is introduced to this reactor and residual propylene is polymerized. Propane can also be added if additional diluent is needed, this propane being injected through conduit 58 which is connected to conduit 56 from the propane storage vessel. In the system of FIGURE 2, all of the vessels can be operated at elevated pressure so that it is not necessary to pump the slurry from reactor 32 to reactor 37. As shown in FIGURE 2, this slurry passes through conduit 34 and timed ball valve 59 into reactor 37 where the ethylene is polymerized as previously described. The reaction temperatures in reactors 10, 32 and 37 are the same as described in connection with FIGURE 1 while in the entire system the pressure is that required to maintain the propylene and/or the propane in the liquid phase. Slightly lower pressure can be used in reactor 37 than in reactors 32 or 10.

The residence time in reactor 10 is about 15 to 150 minutes while the residence time in reactor 32 is about 30 to 120 minutes, this being sufficient to permit the last traces of propylene to polymerize. A residence time in the range of 15 to 150 minutes is also suitable for reactor 37. Normally a residence time of 5 to 20 minutes in washing column 41 is sufficient but it is within the scope of this invention to use two or more washing columns connected in series in order to achieve a more efficient removal of propylene from the polymer solids. In such an arrangement, fresh propane is introduced into the bottom of each of the wash columns and the overhead streams are combined and treated as described above.

An alternative embodiment for washing polymer solids free of propylene is shown in FIGURE 3. In this aspect, polymer slurry in auger conveyor 40 is passed into a perforated-wall, auger conveyor 60 which is surrounded by vessel 61. The auger conveyor 60 is provided with a hollow shaft 62 which contains perforations so that hydrocarbon diluent introduced thereto through conduit 63 passes out through the polymer solids in the conveyor and, thence, out through the perforations in the wall of the conveyor into the annular chamber provided within tank 61. Polymer solids are compressed in conveyor 60 as they are moved therethrough and form a relatively compact mass in the lower portion of this conveyor because of choke 64 restricting the flow of solids from the outlet of the conveyor. Polymer solids flow into reactor 32 where they are reslurried with diluent introduced through conduit 66. Additional diethylaluminum chloride is introduced through conduit 33 so that any residual propylene will polymerize.

The mixture of diluent and propylene removed from polymer solids and accumulating in vessel 61 is removed by way of conduit 67 and passed to a fractionator 68. Propylene recovered as an overhead product through conduit 69 can be reused in the polymerization in reactor 10 while the diluent recovered from the bottom of the fractionator is passed by way of conduit 63 back to the washing auger conveyor 60. Soluble polymer which accumulates in the kettle of fractionator 68 can be removed through conduit 70. Two or more washing stages can be provided in the same manner and the residence time of polymer in each of these stages is about 5 to 20 minutes. The compact polymer in the lower portion of conveyor 60 effectively seals this portion of the conveyor and prevents any of the washed liquid in vessel 61 from passing into reactor 32.

In order to illustrate further the advantages of this invention, the following examples are presented. The materials, conditions and proportions are typical only and should not be construed to limit my invention unduly:

EXAMPLE I

Propylene was polymerized by contacting the liquid phase propylene with a catalyst of diethylaluminum chloride and the reaction product of aluminum and titanium tetrachloride, said reaction product having the approximate formula $TiCl_3 \cdot 1/3AlCl_3$. The mole ratio of diethylaluminum chloride to titanium tetrachloride was 2:1 and the catalyst concentration was 0.052 weight percent based on the monomer present. In the propylene polymerization, 0.1 mole percent hydrogen was used based on the propylene in the reactor. The reaction temperature was 120° F. and the pressure was 400 p.s.i.g. The residence time for the propylene polymerization was 120 minutes. The polypropylene was concentrated by allowing it to settle and the propylene was removed and replaced with n-heptane in which the polypropylene solids were redispersed. About 10 minutes was required for the separation procedure after which additional diethylaluminum chloride was introduced and any residual propylene was permitted to polymerize over a period of about 30 minutes. Ethylene was then contacted with the slurry of polypropylene in n-heptane with the residence time indicated in the following table. The polymerization temperature was 130° F. and the partial pressure of ethylene was 30 p.s.i.g. The polymer product of polymerized propylene and ethylene was recovered in a conventional manner and the polymer was evaluated for impact strength and brittleness temperature. For a comparison, Run 1 was made in which the polymer was recovered directly after the propylene polymerization. Run 6 also shows the results obtained by blending polypropylene and polyethylene:

TABLE I

| Run No.: | Residence time for ethylene polymerization, minutes | Percent of total product as polymerized ethylene | Impact strength, ft. lb./in.[1] | Brittleness temp., °F.[2] |
|---|---|---|---|---|
| 1 | [3] 0 | 0 | 2.5 | 70 |
| 2 | 15 | 7.5 | 6.7 | 13 |
| 3 | 30 | 13.6 | 7.3 | −40 |
| 4 | 60 | 18.8 | 8.6 | −73 |
| 5 | 120 | 37.2 | No break | <−92 |
| 6 | [4] 0 | 15 | 1.6 | >102 |
| 7 | | 0 | 2.4 | 73 |
| 8 | | 100 | No break | <−92 |

[1] ASTM D256–56, 0° F., no notch.
[2] ASTM D746–57T.
[3] Polypropylene.
[4] Physical blend of polypropylene (Run 7) and polyethylene (Run 8).

The above data show that the procedure of this invention wherein propylene is first polymerized in the liquid monomer, the monomer being replaced with an inert diluent and the polymerization continued with ethylene alone on the addition of more catalyst reducing agent, provided a product which has much greater impact strength and lower brittleness temperature than either polypropylene alone or a blend of polypropylene and polyethylene. The products of Runs 1–7 had fluxural module values at least about twice as high as the polyethylene of Run 8.

EXAMPLE II

Runs were made under the same conditions used in the runs of Example I except that the second (ethylene) polymerization step was conducted at 220° F. in butane rather than at 130° F. in n-heptane.

TABLE II

| | Polymer Wt. percent | | Temperature, °F. | | Flex. mod., ×10⁻³, p.s.i. | Brittleness Temp., °F. |
|---|---|---|---|---|---|---|
| | $C_3H_6$ | $C_2H_4$ | Step 1 | Step 2 | | |
| Run No.: | | | | | | |
| 1 [1] | 100 | 0 | 130 | | 208 | 70 |
| 2 [2] | 63 | 37 | 130 | 130 | 160 | <−92 |
| 3 | 100 | 0 | 130 | | 245 | 67 |
| 4 | 65 | 35 | 130 | 220 | 249 | <−96 |

[1] Run 1 of Example I.
[2] Run 5 of Example I.

Comparison of the polymer properties for the two sets of conditions set forth in Example II indicate that a considerable decrease in flexural modulus accompanied the desired lowering of brittleness temperature when both polymerization steps were operated at 130° F., and that there was actually a slight increase in flexural modulus accompanying the same desired lowering of brittleness temperature when the first step was operated at 130° F. and the second step was operated at 220° F.

Although the specific example illustrates the use of butane, other lower boiling solvents such as propane, isobutane, and isopentane can be used.

As will be apparent to those skilled in the art, various modifications can be made in this invention without departing from the spirit or scope thereof.

I claim:
1. A process for copolymerizing two different mono-1-olefins, each in the substantial absence of the other, which comprises contacting a first mono-1-olefin in the liquid phase and in the absence of inert diluent with a coordination polymerization catalyst formed by mixing at least two components, one component being a compound of a metal selected from the group consisting of metals of Groups IV-B, V-B, VI-B and VIII of the Periodic Chart and another component being a reducing agent selected from the group consisting of organometals, metal hydrides, and metals of Groups I-A, II-A, and III-A of the Periodic Chart, under polymerization conditions to form particulate solid phase polymer as a first slurry in said liquid first olefin, separating said solid polymer from the bulk of said first olefin, washing said solid polymer with an inert liquid hydrocarbon diluent, separating at least some of said diluent containing said first olefin from said solid polymer, forming a second slurry of said solid polymer in said diluent, adding more catalyst component reducing agent to said second slurry, holding said second slurry under polymerization conditions to polymerize residual amounts of said first olefin, combining said second slurry with a second different mono-1-olefin, and polymerizing said second olefin.

2. A process according to claim 1 wherein said second olefin is polymerized at a temperature in the range of 200°–250° F. in a low-boiling solvent thus providing a higher flexural modulus at a lower brittleness temperature.

3. A process according to claim 2 wherein said low boiling solvent is selected from the group consisting of butane, isobutane, isopentane and propane.

4. A process according to claim 3 wherein said solvent is butane.

5. The process of claim 1 wherein said first and second olefins are propylene and ethylene, respectively.

6. A process according to claim 5 for copolymerizing propylene and ethylene, each in the substantial absence of the other, which comprises contacting liquid propylene in a first reaction zone with a coordination polymerization catalyst formed by mixing a compound of a metal selected from the group consisting of metals of Groups IV-B, V-B, VI-B and VIII of the Periodic Chart and a reducing agent selected from the group consisting or organometals, metal hydrides, and metals of Groups I-A, II-A, and III-A of the Periodic Chart under polymerization conditions to form a first slurry of particulate solid polypropylene in liquid propylene, settling said slurry to increase the solids content thereof, mixing said slurry thus settled with a saturated liquid hydrocarbon to form a mixture of said hydrocarbon, polypropylene and propylene, fractionally distilling said mixture to obtain an overhead propylene stream which can be reused in said first reaction zone and a bottoms product which is a second slurry of polypropylene in said hydrocarbon, passing said second slurry to a second reaction zone, adding more of said reducing agent to said second slurry and holding same in said second zone under conditions to polymerize residual propylene, passing said second slurry from said second zone to a third reaction zone, adding ethylene to said third zone, and polymerizing said ethylene in the presence of said polypropylene and associated catalyst.

7. The method of claim 6 wherein said metal compound is titanium trichloride, said reducing agent is diethylaluminum chloride, and said saturated hydrocarbon is n-heptane.

8. A process according to claim 6 which includes passing said slurry thus settled into the upper portion of a vertically elongated washing zone, washing said polypropylene countercurrently with liquid propane in said washing zone, withdrawing a mixture of propane and propylene from the top of said washing zone, gravitating polypropylene to the bottom of said washing zone, passing said polypropylene from the bottom of said washing zone to a second reaction zone, slurrying said polypropylene in liquid propane in said second zone, adding more reducing agent to said second zone, polymerizing residual polypropylene in said second zone, passing the slurry from said second zone to a third reaction zone introducing ethylene to said third zone, and polymerizing said ethylene in the presence of said polypropylene and associated catalyst.

9. The method of claim 8 wherein said metal compound is titanium trichloride, and said reducing agent is diethylaluminum chloride.

10. The method of claim 8 wherein said mixtures of propane and propylene is hydrogenated to convert the propylene to propane and then reused in said washing step.

11. A process according to claim 8 which includes compressing and conveying said polypropylene solids through said washing zone, contacting said solids in said washing zone with liquid saturated hydrocarbon, separating said solids from liquid hydrocarbon and propylene, passing said liquid hydrocarbon and propylene thus separated to fractionation to separate propylene reusable in said first reaction zone from liquid hydrocarbon, returning said liquid hydrocarbon to said washing zone, reslurrying said solids from said washing zone in liquid saturated hydrocarbon in a second reaction zone, adding more reducing agent to said second zone, polymerizing residual polypropylene in said second zone, passing the slurry from said second zone to a third reaction zone, introducing ethylene to said third zone, and polymerizing said ethylene in the presence of said polypropylene and associated catalyst.

12. The method of claim 11 wherein said metal compound is titanium trichloride, said reducing agent is diethylaluminum chloride, and said saturated hydrocarbon is n-heptane.

References Cited

UNITED STATES PATENTS 3,193,360   8/1965   Scoggin _____ 260—94.9

FOREIGN PATENTS 594,018   5/1959   Italy.

MURRAY TILLMAN, Primary Examiner

JOHN T. GOOLKASIAN, Assistant Examiner

U.S. Cl. X.R.

23—288